United States Patent
Kluemper et al.

(10) Patent No.: US 10,502,196 B2
(45) Date of Patent: Dec. 10, 2019

(54) SLIP RING SYSTEM FOR A WIND TURBINE WIND TURBINE AND A METHOD FOR PRODUCING ELECTRICAL ENERGY

(71) Applicant: General Electric Company, Schenectady, NY (US)

(72) Inventors: Stephan Kluemper, Gronau/Westfalen (DE); Andre Langel, Stadtlohn (DE); Thomas Edenfeld, Osnabruck (DE); Xianglei Chen, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 677 days.

(21) Appl. No.: 15/150,544

(22) Filed: May 10, 2016

(65) Prior Publication Data

US 2017/0328352 A1    Nov. 16, 2017

(51) Int. Cl.
 *F03D 80/80*  (2016.01)
 *H01R 39/08*  (2006.01)

(52) U.S. Cl.
 CPC .......... *F03D 80/88* (2016.05); *F03D 80/82* (2016.05); *H01R 39/08* (2013.01); *Y02E 10/72* (2013.01)

(58) Field of Classification Search
 CPC .......... F03D 80/82; F03D 80/88; H01R 39/08
 See application file for complete search history.

(56) References Cited

U.S. PATENT DOCUMENTS

| | | | |
|---|---|---|---|
| 8,604,636 B2* | 12/2013 | Miyamoto | F03D 9/25 290/55 |
| 9,422,919 B2* | 8/2016 | Bertolotti | F03D 7/0224 |
| 9,657,591 B2* | 5/2017 | Schleif | F01D 25/04 |

(Continued)

*Primary Examiner* — Woody A Lee, Jr.
*Assistant Examiner* — Christopher R Legendre
(74) *Attorney, Agent, or Firm* — Dority & Manning, P.A.

(57) ABSTRACT

A slip ring system for a wind turbine for electrically connecting a first electrical device and a second electrical device, wherein the first electrical device is mounted to a rotor of the wind turbine, and the second electrical device is mounted to a nacelle of the wind turbine, is provided. The slip ring system comprises a slip ring apparatus and a rotational damping apparatus, with which an electrical connection between the first electrical device and the second electrical device can be established. The slip ring apparatus has a rotatable component with a rotatable electrode and a non-rotatable support electrode, wherein the rotatable electrode is electrically connected to the first electrical device, and the support electrode is electrically connected to the second electrical device. The non-rotatable support electrode and the rotatable electrode are arranged with respect to each other's position and configured such that an electrical connection can be established between the non-rotatable support electrode and the rotatable electrode. The rotational damping apparatus connects the turbine rotor and the slip ring apparatus. The rotational damping apparatus prevents vibrations at least partially from migrating into the rotatable component. The rotational damping apparatus comprises a slip ring portion, a shaft portion and a damping portion. The slip ring portion is mounted to the rotatable component and the shaft portion is adapted for being mechanically connected to the turbine rotor for rotating with the turbine rotor.

16 Claims, 4 Drawing Sheets

(56) References Cited

U.S. PATENT DOCUMENTS

| | | | |
|---|---|---|---|
| 2011/0206515 A1* | 8/2011 | Edenfeld | F03D 7/0204 |
| | | | 416/147 |
| 2013/0195653 A1* | 8/2013 | Hayashi | F03D 7/0296 |
| | | | 416/1 |
| 2013/0221677 A1* | 8/2013 | Hinken | F03D 15/20 |
| | | | 290/55 |
| 2017/0328352 A1* | 11/2017 | Kluemper | F03D 80/88 |

* cited by examiner

SLIP RING SYSTEM FOR A WIND TURBINE WIND TURBINE AND A METHOD FOR PRODUCING ELECTRICAL ENERGY

BACKGROUND OF THE INVENTION

The subject matter described herein relates generally to wind turbines and systems for operating a wind turbine, and more particularly, to slip ring systems for enabling the transfer of electrical energy and electrical signals between single components of the wind turbine or between components of the wind turbine and external devices provided in the operation environment of the wind turbine.

Generally, a wind turbine includes a rotor that comprises a rotatable hub assembly having multiple blades. The blades transform wind energy into a mechanical rotational torque that drives one or more generators via the turbine rotor. The generators are sometimes, but not limited to, rotationally coupled to the turbine rotor by a gearbox. The gearbox steps up the inherently low rotational speed of the turbine rotor for the generator to efficiently convert the rotational mechanical energy to electrical energy. This energy is fed into an electrical grid via at least one electrical connection. Gearless direct-drive wind turbines also exist. The turbine rotor, generator, gearbox and other components are typically mounted within a housing, or nacelle, that is positioned on top of a base that may be a truss or tubular tower.

At least some known wind turbines include a tower and a nacelle mounted on the tower. A turbine rotor is rotatably mounted to the nacelle and is coupled to a generator directly or with the help of a shaft. A plurality of blades extends from the turbine rotor. The blades can be oriented such that wind passing over the blades turns the turbine rotor, thereby driving the generator to generate electricity.

In some wind turbines the blades are mounted rotatably along their longitudinal axis to the hub in order to adjust their angle of attack with regards to the rotational speed and the wind speed. In order to enable such a rotation of the blades the so-called pitch system is provided to the hub which can be electrically controlled by the control system of the wind turbine. Additionally or alternatively further electrical devices can be placed within the hub or the blades.

For enabling an electrical connection between the control system of the wind turbine and electrical components in the hub or in the blades an electrical connection apparatus must be provided for establishing an electrical connection between the rotating components in the hub/rotor and non-rotating electrical components within the nacelle of the wind turbine. Said electrical connection apparatus usually has a delicate and expensive design in order to insure an enduring and uninterrupted electrical connection between the rotating and the non-rotating electrical components.

BRIEF DESCRIPTION OF THE INVENTION

In one aspect, a slip ring system for a wind turbine for electrically connecting a first electrical device and a second electrical device, wherein the first electrical device is mounted to a rotor of the wind turbine, and the second electrical device is mounted to a nacelle of the wind turbine, is provided. The slip ring system comprises a slip ring apparatus and a rotational damping apparatus. With the help of the slip ring apparatus an electrical connection between the first electrical device and the second electrical device can be established. The slip ring apparatus has a rotatable component with a rotatable electrode and a non-rotatable support electrode, wherein the rotatable electrode is adapted for being electrically connected to the first electrical device, and the support electrode is adapted for being electrically connected to the second electrical device. The non-rotatable support electrode and the rotatable electrode are arranged with respect to each other's position and configured such that an electrical connection can be established between the non-rotatable support electrode and the rotatable electrode. The rotational damping apparatus is configured for mechanically connecting the turbine rotor and the slip ring apparatus. Furthermore, the rotational damping apparatus prevents vibrations at least partially from migrating into the rotatable component. Such vibrations can origin from the gearbox, from bearings of the turbine rotor and/or from aerodynamically generated vibrations of a rotor blade. The rotational damping apparatus comprises a slip ring portion, a shaft portion and a damping portion. The slip ring portion is mounted to the rotatable component and the shaft portion is adapted for being mechanically connected to the turbine rotor for rotating with the turbine rotor. As a consequence, the rotatable component of the slip ring apparatus is driven via the slip ring portion and the shaft portion of the rotational damping apparatus.

According to a non-limiting embodiment of the aspect mentioned above, the slip ring apparatus comprises a support component, which carries the support electrode. The support component is, with respect to the nacelle, non-rotatably, directly or indirectly mounted to the nacelle or to any component of the nacelle, for example, but not limited to, a main support of the nacelle.

In another aspect, a wind turbine is provided comprising a turbine rotor, a nacelle and a slip ring system. The turbine rotor includes a turbine rotor with a first electrical device mounted to the turbine rotor. The nacelle comprises a second electrical device, which is mounted to the nacelle. Furthermore, the wind turbine is provided with a slip ring system for electrically connecting the first electrical device and the second electrical device. The slip ring system comprises a slip ring apparatus and a rotational damping apparatus, wherein the slip ring apparatus establishes an electrical connection between the first electrical device and the second electrical device. For such purpose, the slip ring apparatus has a rotatable component with a rotatable electrode and a non-rotatable support electrode, wherein the rotatable electrode is electrically connected to the first electrical device, and the support electrode is electrically connected to the second electrical device. The non-rotatable support electrode and the rotatable electrode are configured such and arranged with respect to each other's position, that an electrical connection is established between non-rotatable support electrode and the rotatable electrode. The rotational damping apparatus is adapted for mechanically connecting the turbine rotor with the rotatable component of the slip ring apparatus, wherein in the same time it is at least partially prevented by the rotational damping apparatus, which vibrations can migrate into the rotational component. For that reason, the rotational damping apparatus comprises a slip ring portion, a shaft portion and a damping portion. The slip ring portion is directly or indirectly mounted to the rotatable component. Further, the shaft portion is mechanically connected to the turbine rotor in order to rotate with turbine rotor. Due to the mechanical connection of shaft portion, damping portion and slip ring portion, these components execute the same rotation like the turbine rotor, at least with respect to the rotational frequency. Said joint rotational movement is not limited to a complete matching of the rotational speed of the turbine rotor and the rotational speed of the rotational component, since rotational vibrations within the turbine rotor may cause a difference in the a variation of the rotational speed with respect to the rotatable component.

According to an embodiment of the second aspect, it is additionally or alternatively disclosed, but not limited to, that the turbine rotor is mounted to a rotor shaft or main shaft, which itself is supported by a main support or main frame of the nacelle. Said main support acts as main structure carrying components of the nacelle, like a generator and a turbine control system. In such case, the shaft portion of the slip ring apparatus is mechanically connected to the rotor shaft and said electrical connection between the first and the second electrical device is established via the rotor shaft. Said mechanical connection between the shaft portion and the rotor shaft and enables a joint rotation of the shaft portion and the rotor shaft, wherein the shaft portion can be connected directly or indirectly to the rotor shaft. In case of an indirect connection, an intermediate component, for example a gearbox shaft protruding a gearbox, is used between the shaft portion and the rotor shaft.

In yet a third aspect, a method for producing electrical energy by operating a wind turbine is provided. Said wind turbine comprises a turbine rotor with a first electrical device, a nacelle with a generator and a second electrical device, and a slip ring system having a slip ring apparatus and a rotational damping apparatus, wherein the rotational damping apparatus includes a slip ring portion, a shaft portion and a damping portion. The method comprises the following steps: rotating the turbine rotor. The turbine rotor is configured to enable a conversion of kinetic wind energy into rotational energy of the turbine rotor. Said rotational energy is transmitted to the generator for producing electrical energy. Furthermore, the rotation of the turbine rotor is transmitted to the rotatable component by rotating the shaft portion and the slip ring portion. With the help of the slip ring system and a suitable electrical connection electrical energy is transmitted between the first electrical device and the second electrical device; said electrical energy can be transmitted for the purpose of enabling a communication, in especially a data transfer, between the first electrical device and the second electrical device. Additionally or alternatively, said energy transfer can be enabled between the first electrical device and the second electrical device by said electrical connection. In a further step it is at least partially prevented, that vibrations being present in the turbine rotor migrate from the shaft portion to the slip ring portion. In particular, said vibrations are prevented from entering the slip ring portion due to a usage of the damping portion, which, according to a first embodiment, can be arranged between the shaft portion and the slip ring portion. According to an alternative embodiment, the damping portion can be arranged in an area of the shaft portion and the slip ring portion, for example parallel to both. Said damping portion can enable a, at least partial dissipation of vibrations entering the damping portion and/or can be configured to filter out certain frequencies and/or amplitudes. Both measures for hindering unwanted vibrations from reaching from the shaft portion into the slip ring portion are, alternatively or additionally, covered by the expression "damping".

According to an additional aspect, the rotational damping apparatus as described above can be designed as a flexible coupling, more particularly as flexible jaw coupling or gear coupling. In such case, the damping portion is arranged—with respect to the direction of the rotational energy flow—between the shaft portion and the slip ring portion of the rotational damping apparatus.

It lies within the scope of the invention, that the first electrical device can be mounted or arranged to any component of the turbine rotor. For example, the first device can be placed within an inner space or to an outer wall of the hub. Furthermore, the electrical device may be an apparatus mounted or used within a rotor blade of the turbine rotor. However, it is essential for the location of the first electrical device, which it rotates jointly with the turbine rotor.

Further it shall be clarified, that the second electrical device can be directly or indirectly mounted to the main support or to a supporting frame structure of the wind turbine. In especially, the second electrical device can be attached to a third support structure, which again is carried by the main support or by a supporting frame structure of the wind turbine.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
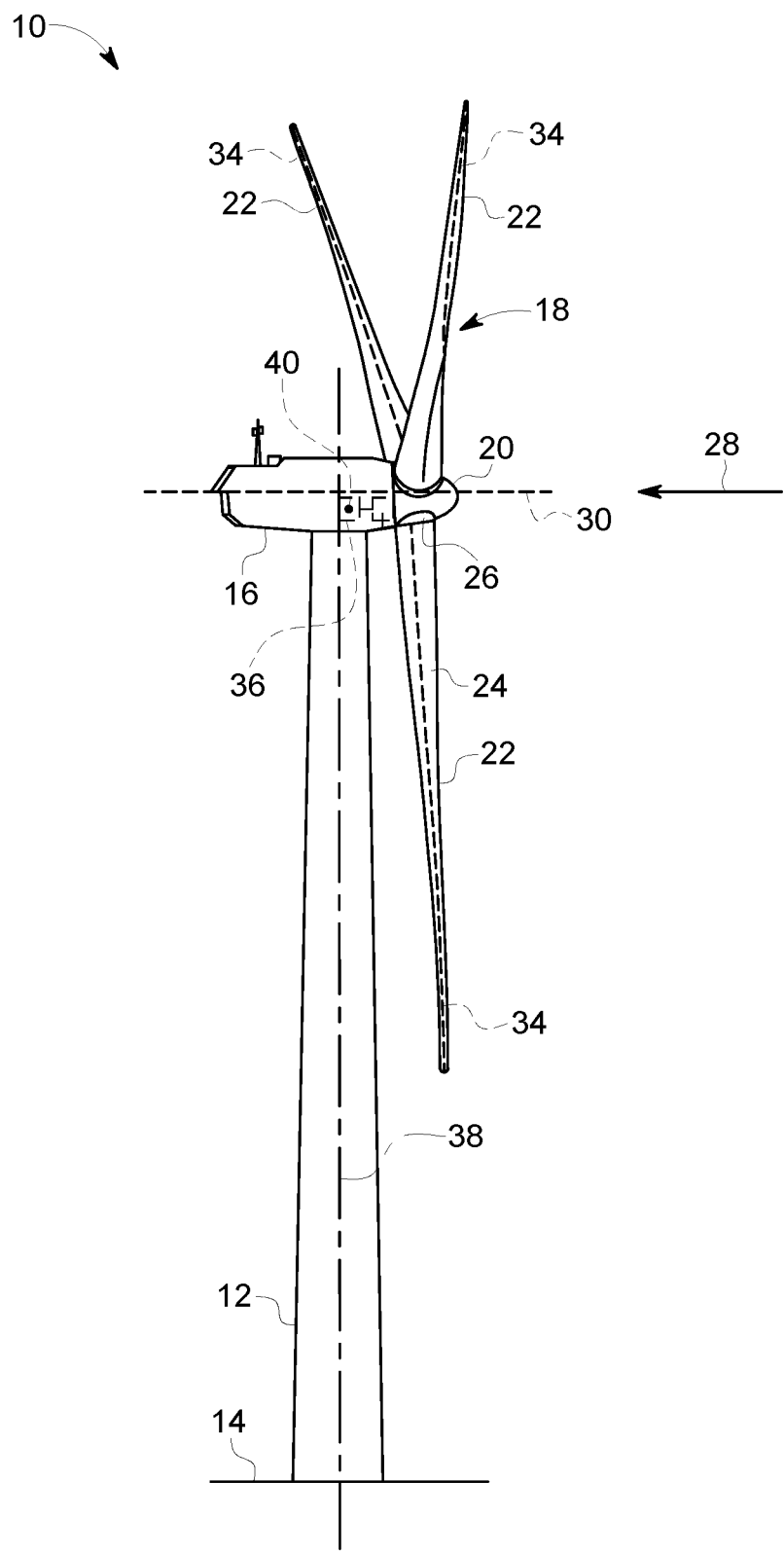
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended, that the present disclosure includes such modifications and variations.

One embodiment described herein includes a slip ring system for a wind turbine for electrically connecting a first electrical device with a second electrical device, wherein the first electrical device is mounted to a turbine rotor and the second electrical device is mounted to a nacelle of the wind turbine. Hence, the first electrical device is arranged rotatably with respect to the second electrical device. Said slip ring system comprises a slip ring apparatus, which is protected from negative influences of vibrations by the usage of a rotational damping apparatus. These vibrations may be present within the turbine rotor and may be caused by an aerodynamic excitation of the blades, bearings of the turbine rotor and/or the gearbox. Hence, delicate parts—for example an electrode or a holder of said electrode—within the slip ring apparatus are less imposed upon by vibrations. By this, it is achieved to increase the liability of mentioned delicate parts and therefore the durability of the slip ring apparatus itself. Additionally, the design of the slip ring apparatus and its parts can be elaborated more efficiently, more particularly, single parts of the slip ring apparatus can be designed less protected, strong and resistive against vibrations. On one hand, the slip ring system as described protects the slip ring apparatus from vibration-caused failure. On the other hand, the slip ring apparatus itself may be designed in the less expensive manner.

Another embodiment provided in the following includes a wind turbine system that is less prone to become inoperative due to the failure of the electrical connection between a first electrical device mounted to a turbine rotor of the wind turbine and a second electrical device, which is mounted to a nacelle of the wind turbine. For that purpose, slip ring system including a slip ring apparatus and a rotational damping apparatus is applied. That causes an at least partially decoupling of the slip ring apparatus from the turbine rotor. Thus, the slip ring system is protected from vibrations being present in the rotating parts of the wind turbine. As a consequence, delicate parts of the slip ring apparatus are not required to withstand vibrations caused by the aerodynamic flow of the blades and/or by the motion of the bearings or the gearbox. By this, it is at least partially prevented, that said vibrations are able to harmfully reach the slip ring apparatus and subsequently cause fatigue fractures, which unpredictably may destroy delicate parts, for example electrodes or holder of those electrodes. More specifically, in comparison to a wind turbine according to the prior art a less complex and less durable slip ring apparatus may be used for connecting rotating electrical devices with nonrotating electrical devices. The application of less complex slip ring apparatus results in a remarkable reduction of costs.

As used herein, the term "wind turbine" is intended to be representative of any device that generates rotational energy from wind energy, and more specifically, converts kinetic energy of wind into mechanical energy.

As used herein, the term "rotor blade" is intended to be representative of any rotating device of the turbine rotor of the wind turbine, which provides a reactive force when in motion relative to a surrounding fluid.

As used herein, the term "wind generator" is intended to be representative of any wind turbine that generates electrical power from rotational energy generated from wind energy, and more specifically, converts mechanical energy converted from kinetic energy of wind to electrical power.

As used herein, the term "electrical device" shall represent any machine, apparatus or component, which consumes or produces electrical energy for or during its operation and/or communicates with other devices via an electrical signal. As non-limiting examples, an electrical device can be a monitoring system within the rotor of the wind turbine, an electrical, hydraulic, pneumatic or mechanical pitch (adjustment) system of the turbine rotor, an auxiliary power unit within the turbine rotor or within the nacelle of the wind turbine, a control system within the turbine rotor or the nacelle and/or and inverter system of the wind turbine.

As used herein, the term "rotational damping apparatus" represents any machine, apparatus or component, which is able to transfer a rotational movement and/or torque from a first rotatable element, for example a rotating shaft, to a second rotatable element, wherein rotational and/or translational vibrations being present in the first rotatable element are at least partially prevented from reaching from the first rotatable element into the second rotatable element. It is a technical effect of the rotational damping apparatus, which vibrations are filtered and/or cannot proceed further, when reaching into the rotational damping apparatus and/or that said vibrations are at least partially dissipated, eliminated and/or compensated by the rotational damping apparatus. Therefore, mentioned vibrations are not fully transmitted from the first into the second rotatable element or are at least reduced when being transmitted from the first into the second rotatable element. Hence, the rotational damping apparatus provides the technical function to transfer rotational movement or torque, but meanwhile it prevents vibrations from being transmitted from the first into the second element. As a consequence, the rotational damping apparatus is at least partially decoupling the second rotational element from the first rotational element in means of transmitting vibrations.

As used herein, the term "translational damping apparatus" is intended to represent any machine, apparatus or component, which at least is able to transfer translational forces from a first element to a second element, but meanwhile reduces or eliminates vibrations being present in one of the elements. By this the mentioned vibrations are not transferred from one element into the other or are at least reduced when being transferred from one element into the other. In this regards the translational damping apparatus is connecting the first element with the second element in means of a load and/or force transfer, but further are decoupling the first element from the second element with respect to a transmittal of vibrations between the elements.

Referring to the upper used term "damping", it lies within the scope of the invention, that the term "damping" includes without limitation a filtering, reflecting, elimination and/or dissipation of any kind of vibration or of any vibration-like phenomenon.

As used herein, the term "electrical connector" is any kind of device, apparatus or component which may be used to effectively transport electric energy or an electric signal from one point to another. As an example, an electrical connector may be embodied as an electric cable or electric rail.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12, which extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a wind direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, in especially an angle that determines a perspective of rotor blades 22 with respect to wind direction 28 of the wind, may be changed by a pitch adjustment system or pitch system 32 to control the load and power generated by wind turbine 10 by adjusting an angular position of at least one rotor blade 22 relative to wind vectors. Pitch axes 34 for rotor blades 22 are shown. During operation of wind turbine 10, pitch system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as wind direction 28 changes, a yaw direction of nacelle 16 may be controlled about a yaw axis 38 to position rotor blades 22 with respect to wind direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor 40. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor 40 and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors 40 described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
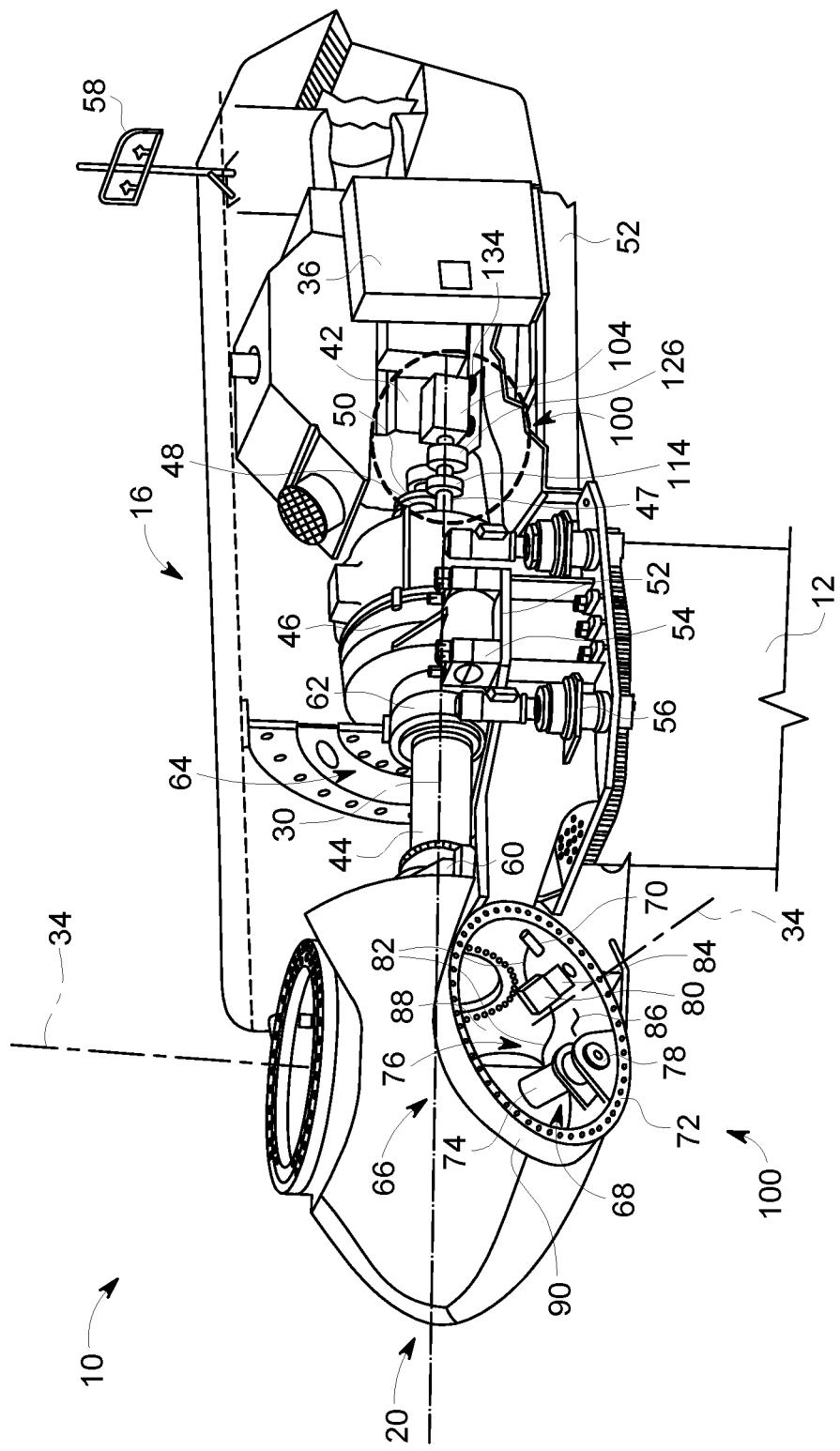
FIG. 2 is an enlarged sectional view of a portion of the wind turbine shown in FIG. 1 having a slip ring system.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a gear box shaft 47 and high speed shaft 48, and a coupling 50. In the exemplary embodiment, rotor shaft 44 is disposed at least partially coaxial to longitudinal axis 116. Rotation of rotor shaft 44 rotatably drives gearbox shaft 47 of gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a main support 52, optionally embodied as main frame. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In the exemplary embodiment, hub 20 includes a pitch assembly 66 of pitch system 32. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84, for example a battery backup system, provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

According to the exemplary embodiment, pitch drive system 68, overspeed control system 80 and/or power generator 84 are electrically connected to control system 36 by the use of an electrical connector 122, for example an electric cable. Pitch drive motor 74 is provided with energy from a turbine electrical system by the use of said electrical connector 122 or from power generator 84. In the latter case, power generator 84 can be an auxiliary power unit including rechargeable backup batteries, which are fed by the turbine electrical system of the wind turbine. Alternatively or additionally, pitch drive motor 74 of pitch drive system 68 is supplied with electrical energy produced from the rotation of hub 20 using a suitable rotary power generation device.

According to an additional or alternative embodiment pitch drive system 68, sensor 70 and/or overspeed control system 80 communicates with control system 36 via a suitable signal connector, which can be embodied, but not limited to, as an electrical connector 122, for example as an electric cable or a plurality thereof.

Independent from the manner of providing electrical energy for powering pitch assembly 66 and/or enabling an electrical communication for controlling pitch assembly 66 via the control system 36, mentioned electrical connector 122 reaches from cavity 86 of hub 20 through an interior of rotor shaft 44 into an interior of gearbox shaft 47.

Figure 3:
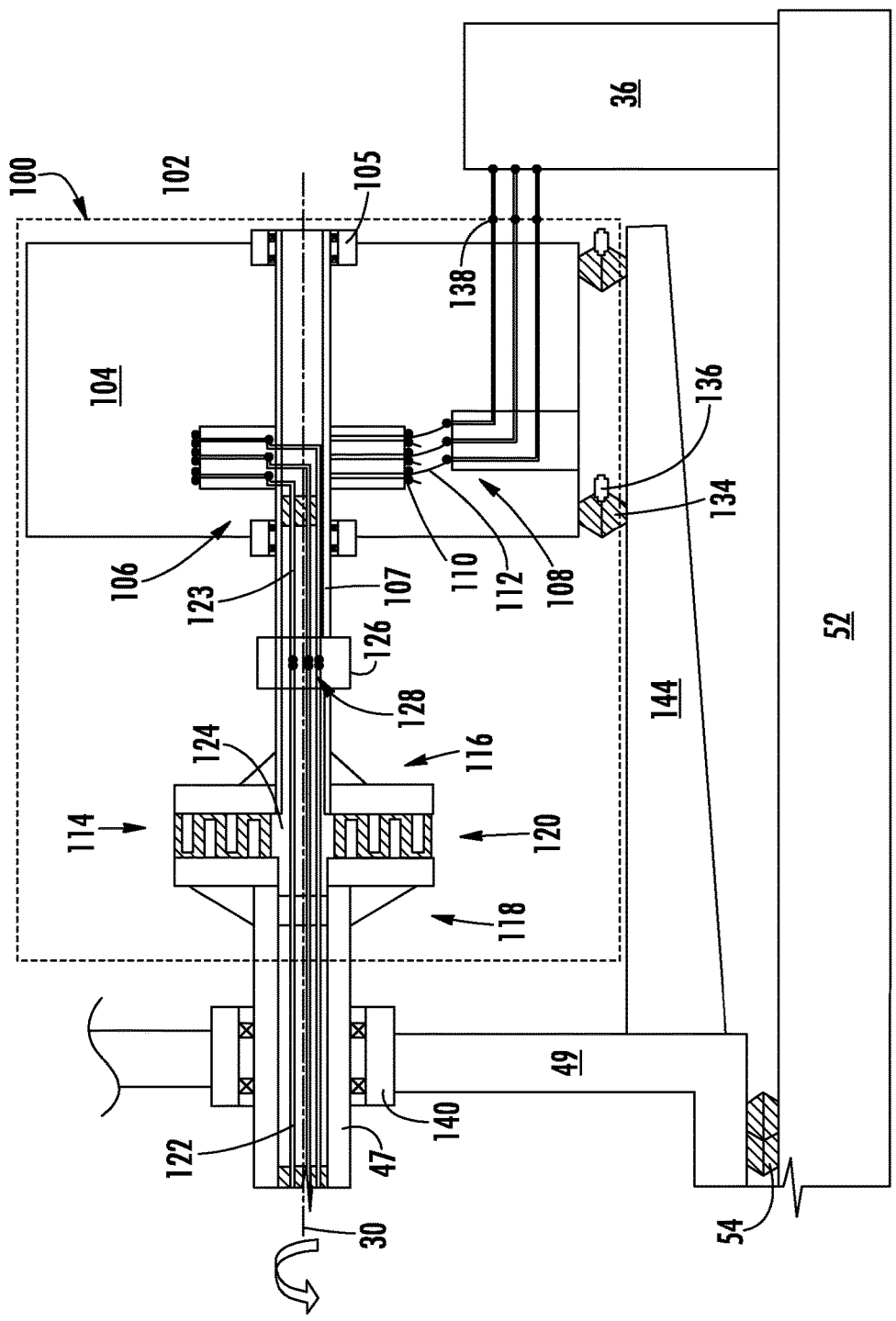
FIG. 3 is schematic representation of a slip system for electrically connecting a first electrical device with a second electrical device.
Figure 4:
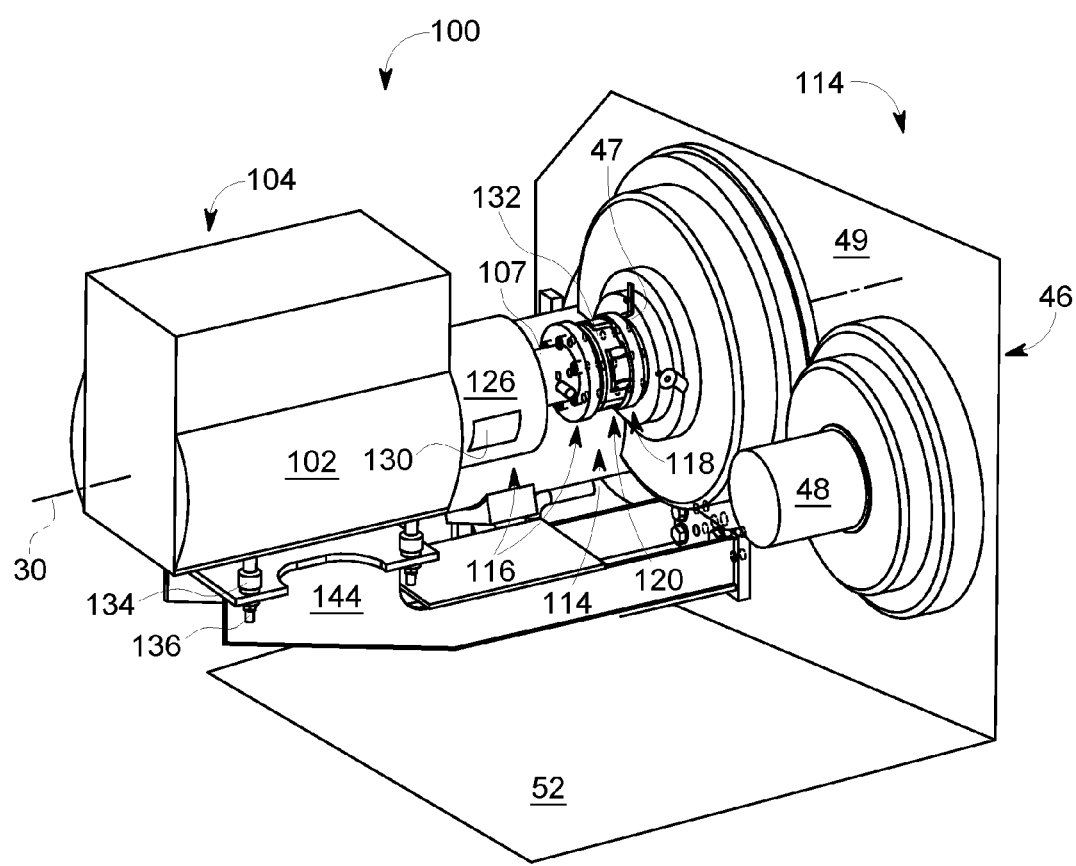
FIG. 4 shows a detailed, sectional and perspective view of the slip ring system depicted in FIG. 2.

FIG. 3 and FIG. 4 shows the arrangement of the slip ring system 100 within the interior of nacelle 16, wherein FIG. 4 depicts an exemplary, non-limiting embodiment of the slip ring system 100. Furthermore, for enabling a profound understanding regarding the working principle and assembly slip ring system 100 is shown by the schematic FIG. 3. However, said schematic representation of an embodiment of slip ring system 100 is not a limitation of the invention. Since gearbox shaft 47 is hollow and reaches through the gearbox housing 49 of gearbox 46, an opening of the interior of gearbox shaft 47 is located in or at housing 49 of gearbox 46 or protrudes from housing 49 outwards. Thus, the opening of the interior of gearbox shaft 47 is facing an area, where the electric generator 42 is located on the main support 52. Within gearbox housing 49 a suitable bearing 140 can be arranged in order to support gearbox shaft 47.

According to the exemplary embodiment shown in FIG. 3 and FIG. 4 slip ring system 100 is located opposite to gearbox wall 49 and is supported on a support beam 144. Due to the fact that gearbox 46 is supported by main support 52 and said support beam 144 is mounted to gearbox wall 49 of gearbox 46, slip ring system 100 is indirectly supported by and mounted to main support 52. This exemplary embodiment of supporting slip ring system 100 with the help of support beam 144 directly to the gearbox comes with the benefit of reducing relative displacement of slip ring system 100 with respect to gearbox 46. This is because said arrangement allows slip ring system 104 to follow any motion and displacement of gearbox 46.

According to an alternative embodiment, but not limited to, slip ring system 100 can be mounted directly to main support 52 or to an additional support device arranged on the main support 52 without firstly being attached to gearbox 46.

According to the exemplary embodiments shown in FIG. 3 and FIG. 4, slip ring device 100 comprises a rotational damping apparatus 114 and a slip ring apparatus 104, wherein the rotational damping apparatus 114 includes a shaft portion 118, a damping portion 120 and a slip ring portion 116. Shaft portion 118 and gearbox shaft 47 are attached to each other for rotating simultaneously. Furthermore, rotational damping apparatus 114 transmits said rotation to a support component 106, for example, but not limited to, having an input shaft 107, of slip ring apparatus 104. For this purpose, slip ring portion 116, a shaft portion 118 and a damping portion 120 are arranged such that damping portion 120 mechanically connects slip ring portion 116 and shaft portion 118. Additionally, damping portion 120 decouples said portions 116 and 118 from each other for preventing vibrations being present in rotor shaft 44 and/or gear box shaft 47 to transfer from shaft portion 118 into slip ring portion 116.

According to an embodiment, as shown in FIG. 4, rotational damping apparatus 114 can be realized, but not limited to, in form of a flexible coupling 132. Said flexible coupling 132 is effectively mounted between an end of gearbox shaft 47 and input shaft 107 of the rotatable component 106. Both, slip ring portion 116 and shaft portion 118 are equipped with axial protrusions, wherein said protrusions are arranged on faces placed opposite to each other on each portion 116 and 118. For transmitting torque and/or rotation protrusions of slip ring portion 116 overlap protrusions of shaft portion 118 in an axial direction and thereby forming a form fit torque and rotation transmission. A damping material of damping portion 120 is placed circumferentially between the overlapping protrusions, which leads to a decoupling of both portions in regards a transmission of vibrations. In the meantime, circumferential forces can be conducted via protrusions of shaft portion 118, damping material and protrusions of slip ring portion 116.

An alternative embodiment of rotational damping apparatus 114 is depicted in FIG. 3. Protrusions of shaft portion 118 and slip ring portion 116—thereby arranged in damping portion 120—do not necessarily need to share undercuts being related to each other, but are arranged with respect to each other with a certain distance. The space between protrusions is filled up with a damping material, which hereby provides a form fit and flexible connection for load transfer between shaft portion 118 and slip ring portion 116, in especially between protrusions thereof.

As shown in FIG. 3, slip ring system 100 electrically connects electrical connector 122, being arranged within the interior of gearbox shaft 47, with control system 36. For enabling said electrical connection rotational damping apparatus 114 has a central cavity 124, which provides a pathway from the interior of gearbox shaft 47 to the interior of slip ring portion 116.

According to an exemplary, non-limiting embodiment, flexible coupling 132 comprises a cavity for an arrangement of electrical connector 122.

According to an alternative, not shown embodiment, rotational damping apparatus does not include a cavity for receiving an electrical connector, but such electrical connector is guided via a radial outer shape of the rotational damping apparatus. In such case, suitable guiding arrangements are provided with the rotational damping apparatus.

Additionally or alternatively, an embodiment is disclosed, wherein the slip ring portion 116 is mechanically connected to the rotatable component 106 via a connecting device 126 having an access opening 130. The purpose of said connecting device 126 is to provide access for staff personal to reach into the interior of slip ring portion 116 and rotatable component 106. Accordingly, connecting device 126 comes with openings on both axial sides allowing access as mentioned above. Hence, electrical connector 122 arranged within slip ring portion 116 can be connected to further electrical connector 123 being present within rotatable component 106 via an electrical joint 128.

According to an embodiment rotatable component 106 comprises a rotatable electrode 110, wherein the electrode 110 is electrically connected with an electrical connector 123. Slip ring apparatus 104 further comprises a support component 108, which is mounted non-rotatably with regards to main support 52, and which is equipped with a support electrode 112. Support component 108, support electrode 112 and rotatable electrode 110 are arranged with respect to each other such that an electrical connection is formed between rotatable electrode 110 and support electrode 112. The entire electrical connection between a rotating, first electrical device on the rotatable component of rotor 18, for example a pitch drive system 68 arranged in/on hub 20 of wind turbine 10, and a non-rotating, second electrical device within or on nacelle 16, for example, but not limited to, a control system 36, is effectively completed by an electrical connection between the support electrode 112 and control system 36 via electrical joint 138.

According to an embodiment, slip ring apparatus 104 is mounted, in particular firmly but not stiffly, to a support arrangement, for example main support 52 or support beam 144. In order to protect slip ring apparatus 104 from vibrations being present in said support arrangement, slip ring apparatus 104 is mounted via a suitable translational damping apparatus 134 to the support arrangement. This results in the technical effect, that delicate components of slip ring apparatus 104 are not only separated in means of vibrations from gearbox shaft 47, but are also decoupled with respect to vibrations being present in said support arrangement.

Additionally or alternatively, translational damping apparatus 134 may be effectively equipped with a tuning arrangement 136. By this, any inconvenient resonance phenomenon can be prevented by simply de-tuning resonance characteristics of translational damping apparatus 134 with respect to an existing resonance excitation, for example, but not limited to, originating from gearbox 46, in especially from teeth of gears within gearbox 46, or from generator 42.

According to a further embodiment, slip ring apparatus 104 has a housing 102, which holds rotatable component 106, for example with the help of suitable bearings 105, and which covers delegate components like electrodes 110, 112 and support component 108.

FIG. 4 is a sectional view of nacelle according to FIG. 2, wherein only the backside of housing 49 of gearbox 46, main support 52 and slip ring system 100 is shown. Protruding from housing 49, gearbox shaft 47 is rotationally connected with shaft portion 118 of rotational damping apparatus 114, herein embodied as flexible coupling 132. According to the present embodiment, gearbox shaft 47 is essentially aligned with rotor shaft 44 and an axis of rotation 30 of rotor 18. Slip ring portion 116 of flexible coupling 132 transmits rotation of the turbine rotor to slip ring apparatus 104, wherein vibrations of rotor 18 and/or gear box shaft 47 are at least partially eliminated, so that said vibrations are at least partially prevented from proceeding into the slip ring apparatus 104. High-speed shaft 48 of gearbox 46 drives an electric generator, which is not shown in FIG. 4. Support beam 144 is attached to gearbox 46, in particular to the backside of housing 49, further said support beam 144 supports slip ring apparatus 104. Gearbox 46 is mounted to the main support 52 via a mounting device 54. Hence, slip ring system 100 and slip ring apparatus 104 are mounted to and supported by the main support 52 via the support beam 144 and gearbox 46.

The above-described systems and methods facilitate, that delicate parts like an electrode or a holder of said electrode within the slip ring apparatus are less imposed upon by vibrations. By this it is achieved, that the liability of mentioned delicate parts—and therefore the durability of the slip ring apparatus itself—is increased. In the meantime, the design of the slip ring apparatus and its parts can be elaborated more efficiently, more particularly, single parts of the slip ring apparatus can be designed less protected, strong and resistive against vibrations. On one hand, the slip ring system as described protects the slip ring apparatus from vibration-caused failures. On the other hand, the slip ring apparatus itself may be designed in the less expensive manner.

Exemplary embodiments of a slip ring system for a wind turbine, of a wind turbine comprising a slip ring system and of a method for operating a wind turbine having a slip ring system are described above in detail. The systems and methods are not limited to the specific embodiments described herein, but rather, components of the systems and/or steps of the methods may be utilized independently and separately from other components and/or steps described herein.

For example, the slip ring system can be applied in a direct-drive wind turbine, or in a wind turbine not having a gearbox. A wind turbine comprising a direct-drive may come with an alternative bearing concept of the turbine rotor, in especially the hub of the turbine rotor can be supported by a cone protruding a main support or the mainframe of the nacelle of the wind turbine. Accordingly, a slip ring system can be mounted in an area of the cone and may have a different arrangement of electrodes of the slip ring apparatus. Thus, described embodiments of a slip ring system for a wind turbine, of a wind turbine comprising a slip ring system and of a method for operating a wind turbine are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A slip ring system for a wind turbine for electrically connecting a first electrical device and a second electrical device, wherein the first electrical device is mounted to a turbine rotor of the wind turbine, and the second electrical device is mounted to a nacelle of the wind turbine, the slip ring system comprising:
    a slip ring apparatus for establishing an electrical connection between the first electrical device and the second electrical device, the slip ring apparatus having a rotatable component with a rotatable electrode and a non-rotatable support electrode, wherein the rotatable electrode is electrically connectable to the first electrical device, the non-rotatable support electrode electrically connectable to the second electrical device, and the non-rotatable support electrode and the rotatable electrode are arranged for establishing an electrical connection;
    a rotational damping apparatus for mechanically connecting the turbine rotor and the slip ring apparatus while at least partially preventing vibrations from migrating into the rotatable component, comprising a slip ring portion, a shaft portion and a damping portion, wherein the slip ring portion is mounted to the rotatable component and the shaft portion is adapted for being mechanically connected to the turbine rotor for rotating with the turbine rotor,
    an electrical connector for connecting the first electrical device with the rotatable electrode, wherein the rotational damping apparatus is adapted for at least partially receiving and guiding the electrical connector; and
    a connecting device for accommodating an electrical joint of the electrical connector, wherein the connecting device is arranged between the rotational damping apparatus and the rotatable component for rotating with rotational damping apparatus and the rotatable component.

2. The slip ring system according to claim 1, wherein the rotational damping apparatus comprises an opening axially projecting through the rotational damping apparatus via the slip ring portion and the shaft portion, and wherein the rotational damping apparatus receives the electrical connector.

3. The slip ring system according to claim 1, wherein the connecting device comprises an access opening for accessing an interior of the connecting device for mounting and maintenance reasons.

4. The slip ring system according to claim 1, wherein the damping portion is arranged between the slip ring portion and the shaft portion.

5. The slip ring system according to claim 1, further comprising a damper for mechanically connecting a support component of the slip ring apparatus and the nacelle while at least partially preventing vibrations from migrating into the support component, wherein the damper is configured to be arranged between the support component and the nacelle.

6. The slip ring system according to claim 5, wherein the damper comprises a tuner coupled thereto for adjusting vibration and/or damping characteristics of the damper.

7. A wind turbine comprising:
    a turbine rotor including a first electrical device mounted to the turbine rotor;

a nacelle including a second electrical device, wherein the nacelle rotatably supports the turbine rotor, and wherein the second electrical device is mounted to the nacelle; and a slip ring system for electrically connecting the first electrical device with the second electrical device, wherein the slip ring system comprises:
- a slip ring apparatus for establishing an electrical connection between the first electrical device and the second electrical device, the slip ring apparatus having a rotatable component with a rotatable electrode and a non-rotatable support electrode, wherein the rotatable electrode is electrically connected to the first electrical device, the non-rotatable support electrode is electrically connected to the second electrical device, and the non-rotatable support electrode and the rotatable electrode are arranged for establishing an electrical connection,
- a rotational damping apparatus mechanically connecting the turbine rotor and the slip ring apparatus while at least partially preventing vibrations from migrating into the rotatable component, comprising a slip ring portion, a shaft portion and a damping portion, wherein the slip ring portion is mounted to the rotatable component and the shaft portion is mechanically connected with the turbine rotor for rotating with the turbine rotor,
- an electrical connector for connecting the first electrical device with the rotatable electrode, wherein the rotational damping apparatus is adapted for at least partially receiving and guiding the electrical connector, and
- a connecting device for accommodating an electrical joint of the electrical connector, wherein the connecting device is arranged between the rotational damping apparatus and the rotatable component for rotating with the rotational damping apparatus and the rotatable component.

8. The wind turbine according to claim 7, wherein the rotational damping apparatus comprises an opening axially projecting through the rotational damping apparatus via the slip ring portion and the shaft portion, a and wherein the rotational damping apparatus receives the electrical connector.

9. The wind turbine according to claim 7, wherein the connecting device comprises an access opening for accessing an interior of the connecting device for mounting and maintenance reasons.

10. The wind turbine according to claim 7, wherein the damping portion is arranged between the slip ring portion and the shaft portion.

11. The wind turbine according to claim 7, wherein the slip ring system comprises a damper mechanically connecting a support component of the slip ring apparatus and the nacelle while at least partially preventing vibrations from migrating into the support component, wherein the damper is arranged between the support component and the nacelle.

12. The wind turbine according to claim 11, wherein the damper comprises a tuner coupled thereto for adjusting vibration and/or damping characteristics of the damper.

13. The wind turbine according to claim 11, wherein the nacelle comprises a gearbox with a gearbox shaft connected with the turbine rotor, the gear box shaft has a hollow, inner tube, which completely projects through the entire gearbox, and wherein the electrical connector is accommodated within the tube.

14. The wind turbine according to claim 13, wherein the nacelle further comprises a support beam mounted to the gearbox, and the support component is mounted to the support beam.

15. The wind turbine according to claim 7, comprising a tower, wherein the nacelle is rotatably mounted to the tower for rotating in a mainly horizontal plane around a longitudinal axis of the tower.

16. A method for producing electrical energy by operating a wind turbine, wherein the wind turbine comprises a turbine rotor with a first electrical device, a nacelle with a generator and a second electrical device, and a slip ring system having a slip ring apparatus and a rotational damping apparatus, the slip ring apparatus having a rotatable component with a rotatable electrode and a non-rotatable support electrode, wherein the rotational damping apparatus includes a slip ring portion, a shaft portion and a damping portion, the method comprising the following steps:
a) rotating the turbine rotor due to a conversion of kinetic wind energy into rotational energy;
b) transmitting rotational energy from the turbine rotor to the generator for producing electrical energy;
c) transmitting a rotation of the turbine rotor to the rotatable component by rotating the shaft portion and the slip ring portion;
d) transmitting electrical energy between the first electrical device and the second electrical device, the first electrical device being connected with the rotatable electrode via an electrical connector;
e) providing a connecting device for an electrical joint of the electrical connector, the connecting device arranged between the rotational damping apparatus and the rotatable component for rotating with the rotational damping apparatus and the rotatable component; and
f) at least partially preventing vibrations being present in the turbine rotor from migrating from the shaft portion to the slip ring portion by using the damping portion.

* * * * *